June 17, 1930.   A. D. BOOTH   1,763,750
ROLLER BEARING
Filed April 29, 1927

Augustus D. Booth
INVENTOR.

BY Edwin P. Corbett
ATTORNEY.

Patented June 17, 1930

1,763,750

UNITED STATES PATENT OFFICE

AUGUSTUS D. BOOTH, OF COLUMBUS, OHIO

ROLLER BEARING

Application filed April 29, 1927. Serial No. 187,517.

My invention relates to roller bearings and, more particularly, to an improvement in the construction of the rollers and the end rings or the retaining means therefor. This invention relates, especially, to that type of roller bearing in which the rollers are of a cylindrical form and are held in proper relation and against endwise displacement by retaining rings or similar means. However, my invention is also applicable to tapered rollers and may be applicable to other types of bearings. Furthermore, this invention provides a roller bearing so constructed that each roller forms a tie, eliminating the use of tie pins, or the like.

Previous experience in the roller bearing art has shown that the greatest imperfection in roller bearings, especially where the rollers take end thrusts and are very long, resides in the fact that the rollers are likely to become disaligned or skewed. Heretofore, various methods have been resorted to, with the idea of overcoming this difficulty, but with very little or no success.

One object of my invention is to provide a roller bearing wherein the means for maintaining the correct alignment of each roller with relation to the bearings is provided by the roller itself.

Another object of this invention is to provide a roller bearing wherein the rollers take the radial strain of the bearing and, also, the lateral strain or end thrust of both bearing members.

Still another object of my invention is to provide a roller bearing having more of a roller surface for the moving parts contacting therewith, tending to cause easier movement and longer life for the bearing.

A further object of my invention is to provide a roller bearing which may be readily assembled or taken apart.

Other and further objects of my invention will appear from the following description and the prefered embodiment of my invention will be seen in the acompanying drawings wherein similar characters of reference designate corresponding parts and wherein Figure 1 is an end view of my roller retaining means with the rollers disposed therein and the entire roller bearing disposed in a bearing housing.

Figure 1:
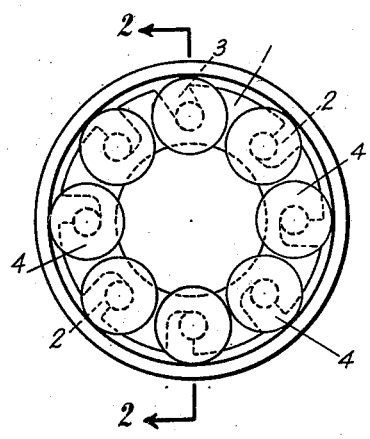
Figure 2:
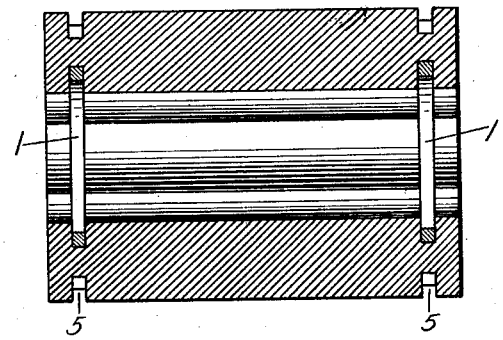
Figure 2 is a section taken on line 2—2 of Figure 1 with the bearing housing omitted.
Figure 3:
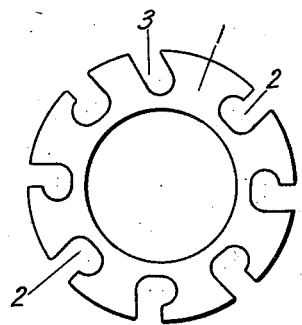
Figure 3 is a plan view of the end ring or roller retaining means.
Figure 4:
Figure 4 is an edge view of the device shown in Figure 3.

With reference to the drawings, I have shown a roller bearing comprising rigid one-piece end rings 1. Each end ring has the undercut mortices or grooves 2 therein and a mortice or groove 3 which is not undercut. It will be noticed that the mortices or grooves 2 are all undercut on the same side of the groove, or in the same direction, the purpose of which will be hereinafter more fully described. As shown in Figures 3 and 4, the end rings are made in one piece and are, preferably, made just wide enough to have sufficient strength to withstand the end thrust of the rollers and the radial strain of the bearing.

Figure 5:
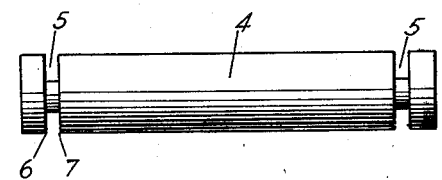
Figure 5 is a side elevation of a roller constructed in accordance with the idea disclosed by my invention.

Figure 5 shows a roller constructed in accordance with the idea disclosed by my invention having circumferential recesses 5 on each end thereof. The circumferential recesses 5 are made of a width substantially corresponding to the thickness of the end rings 1, but, preferably, slightly larger to allow freedom of action of the rollers and reduce the friction between the rollers and the end rings to a minimum.

The construction of this roller bearing is such that the bearing may be readily taken apart or assembled, since all that is required to take the bearing apart or to assemble it is to place the rollers in the end rings 1. In assembling the bearing into operative relation the rollers 4 are placed so that the circumferential recesses 5 correspond to the undercut mortices or grooves 2 of the end ring 1. After the rollers have been assembled in the undercut mortices or grooves 2, a similar roller is placed in the groove 3. The roller placed in the groove 3 acts as a key roller holding the other rollers in such position that they cannot slip out of the undercut mortices or grooves 2.

This bearing, as shown, does not require tie pins or spacing rollers to hold the bearing together as a unit. Each roller has the shoulders 6 and 7 formed by the circumferential slots 5 in the ends of the rollers 4. The cage or end ring fitting between these rollers provides a rigid unit which cannot twist out of alignment. If the rollers were to be twisted out of line, the shoulder 6 on one side of the end ring would force against the end ring in one direction while the shoulder 7 on the opposite side of the end ring would force against the ring in the opposite direction, tending to bring the roller back into its proper alignment. It will be clearly understood that many minor changes may be made in the parts or construction of this roller bearing without departing from the spirit of my invention.

By reference to the preceding description and the drawings attached hereto, it will be seen that I have provided a roller bearing wherein the rollers maintain themselves in correct alignment and wherein the rollers take the radial strain of the bearing and, also, the lateral strain or end thrust of both bearing members.

It will also be clearly understood that I have provided a roller bearing having a maximum rolling surface for the moving parts contacting therewith and, at the same time, have provided a roller bearing which may be readily taken apart or assembled. Likewise, it will be apparent that the end members may be of cast metal or may be of other material or form and that I am not, necessarily, limited to the use of only two supporting members for the rollers.

Having thus described my invention, what I claim is:

1. In a roller bearing, the combination of bearing rollers having peripheral grooves near their ends, an end ring for said rollers comprising an annular plate member whose thickness substantially corresponds to the width of the peripheral grooves of said rollers and a plurality of mortices or grooves disposed about the periphery of said end ring, said mortices or grooves being undercut and adapted to receive said rollers.

2. In a roller bearing, the combination of a series of bearing rollers having peripheral grooves therein, a retaining ring for said rollers comprising an annular plate member, said plate member having a plurality of undercut mortices or grooves disposed about its periphery, said mortices being undercut in the same direction.

3. In a roller bearing, a series of bearing rollers each having a peripheral groove therein, a retaining ring for said rollers comprising an annular plate member whose thickness substantially corresponds to the width of the peripheral groove in said roller and a plurality of mortices or grooves disposed on the periphery of said end ring, the majority of these mortices or grooves being undercut.

4. In a roller bearing, the combination of a series of bearing rollers having peripheral grooves near their ends, an end ring for said rollers comprising a flat annular plate member having an unbroken inner periphery and an outer periphery having a plurality of undercut mortices or grooves therein for the reception of said rollers and a single straight cut groove therein for the reception of a key roller to hold the other rollers in such position that they cannot slip out of the undercut mortices or grooves.

5. In a roller bearing, the combination of a series of bearing rollers having peripheral grooves near their ends, an inner and outer race, an end ring for said rollers comprising a flat annular plate member, having an unbroken inner periphery and an outer periphery having a plurality of undercut mortices or grooves, and a single straight groove cut therein for reception of said rollers, said roller received in said straight groove acting as a locking means for holding said other rollers in said undercut mortices or grooves in position while said rollers are being positioned within said inner and outer race.

6. In a cage bearing, the combination of an inner and outer race member, bearing rollers, means for the reception of said bearing rollers, and means for locking said bearing rollers in position relative to each other prior to their contact with said inner or outer race members and without changing the form or position of said receiving or said locking means.

7. In a roller bearing, the combination of a series of bearing rollers having peripheral grooves near their ends, an end ring for said rollers comprising a flat annular plate member having a plurality of mortices or grooves disposed about the outer periphery only, for the reception of said rollers.

8. A roller bearing comprising a plurality of rollers, and supporting rings therefor, said supporting rings having roller holding sockets which extend in a substantially radial direction and which are provided with lateral extensions, said rings and their sockets being of such a structure that the maintenance of certain of the rollers in proper position will lock the remaining rollers against removal.

In testimony whereof I hereby affix my signature.

AUGUSTUS D. BOOTH.

CERTIFICATE OF CORRECTION.

Patent No. 1,763,750. Granted June 17, 1930, to

AUGUSTUS D. BOOTH.

It is hereby certified that error appears in the printed specification of the above numbered patent requiring correction as follows: Page 1, line 79, before the word "having" insert the syllable and words "vention comprising a cylinder roller 4"; and that the said Letters Patent should be read with this correction therein that the same may conform to the record of the case in the Patent Office.

Signed and sealed this 9th day of September, A. D. 1930.

(Seal)

M. J. Moore,
Acting Commissioner of Patents.